Feb. 11, 1969   D. W. TRYHORN   3,426,736
TWO-STROKE CYCLE INTERNAL COMBUSTION ENGINE
Filed May 31, 1967

United States Patent Office 3,426,736
Patented Feb. 11, 1969

3,426,736
TWO-STROKE CYCLE INTERNAL COMBUSTION ENGINE
Donald Wilfred Tryhorn, Slough, England, assignor to Sir W. G. Armstrong Whitworth & Company (Engineerings) Limited, Slough, England, a British company
Filed May 31, 1967, Ser. No. 642,413
Claims priority, application Great Britain, June 13, 1966, 26,247/66
U.S. Cl. 123—65            4 Claims
Int. Cl. F02b 25/14

ABSTRACT OF THE DISCLOSURE

An exhaust gas driven turbocharged multi-cylinder two-stroke cycle internal combustion engine having at least two air chests, at least one supplied directly and at least one supplied by way of a series charger.

---

Figure 1:
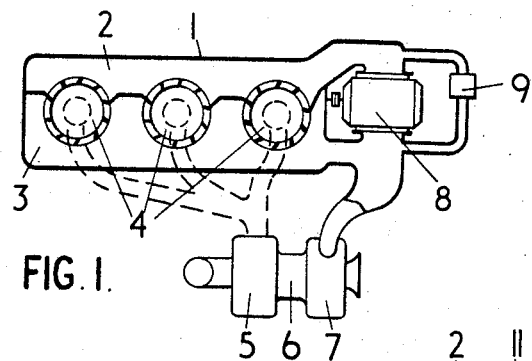

The invention relates to exhaust gas driven turbocharged multi-cylinder two-stroke cycle engines of the type having a series charger between the turbine driven supercharger and engine ports.

The two most used turbocharging systems are the "simple system" and the "series system." In the simple system the turbocharger alone provides the excess of pressure in the air chest over that in the exhaust duct which is necessary for there to be a supply of air to the engine cylinders. Generally, this pressure difference is not sufficient over the whole of the speed and load range. In the series system another compressor known as the series charger is added to the system after the turbocharger compressor to give a second stage of compression. This raises the pressure difference between the air chest of all the cylinders and the exhaust duct between the engine and turbine to a value greater than that given by the turbine driven supercharger alone. For a comparable air flow through the engine the series system permits the use of a lower turbocharger efficiency, and gives unaided starting. It is therefore used for small engines having a wide speed range.

The application of the series system involves the use of a compressor as the series charger having a throughput at least comparable to the capacity of the engine, that is compressor delivery in ft.³/min. equal to or greater than the engine swept volume in ft.³ × engine speed in rev./min. This series charger is bulky, costly, and absorbs an unnecessary amount of power particularly at high engine speeds. The power absorbed directly lowers the engine output and efficiency, and also, by causing an increase in the temperature of the charging air, lowers the charge density and cycle efficiency.

The object of the present invention is to provide a two-stroke cycle internal combustion engine without the above disadvantages.

The invention consists in an exhaust gas driven turbocharged multi-cylinder two-stroke cycle internal combustion engine wherein the improvement comprises the provision of at least two air chests supplying each cylinder through a single belt of inlet ports, at least one said air chest being supplied directly by a turbocharger and at leasct one other by a series charger in conjunction with said turbocharger.

The invention further consists in an engine as set forth in the preceding paragraph in which the cylinder ports communicating with the air chest supplied by the series charger offer a greater restriction to flow than those in communication with the air chest supplied by the simple turbocharging system.

The invention further consists in an engine as set forth above, in which the air chest formed by the enclosed volume between the air ports and the series charger has a volume of less than 4 cylinder swept volumes.

The invention further consists in an engine as set forth above in which the air ports supplied by the series charger open earlier than those supplied directly by the turbocharger.

To obtain good starting some air should be made to pass through the cylinders after the first combustion has taken place so that at least some of the residual exhaust gas is replaced by air. When the simple turbocharging system is used this does not take place unless some ancillary supply is provided. This is rarely available on small engines and so they are usually provided with the series charging system so that there is a positive supply of air for starting. To pass adequate air for high load conditions the normal series compressor passes a volume of air greater than the swept volume of the engine. This necessitates employing a compressor larger than is necessary for starting. Furthermore, this compressor is not used at an economically high loading because over a substantial power range the turbo charger can provide all or very nearly all of the air that the engine needs.

In the engine constructed in accordance with the invention part of the air from the turbocharger passes directly to an air chest supplying the engine cylinders and the rest passes to a series charger which may be an engine driven compressor and which supplies air to a second air chest and which also supplies the engine cylinders through a separate segment of the belt of air ports. Thus each cylinder has a single belt of air ports some ports open into one air chest and the rest to the other. A belt of ports is a number of passages through the cylinder wall which when uncovered by the piston permit the gas transfer part of the engine working cycle to take place. A single belt of ports, or that one remote from the combustion chamber if there is more than one belt, carries out the scavenge process of displacing the exhaust gases from the cylinder, a second belt of ports can be used to add high pressure air for charging. However, this has been found unnecessary when a turbocharger is added and in this case it is advantageous to use air at two different pressures through the same belt of ports. This pressure difference is not as great as for two port belt type engines because a high charge pressure can be obtained by having the whole scavenge and exhaust process at a high pressure as determined by the size of the turbocharger nozzles. The difference in pressure required is that resulting from the difference in flow loss through the respective segments of ports. The ratio of the segment of the engine cylinder occupied by ports supplied by air from the simple turbocharging system to that occupied by those supplied by the series charging system can be made substantially the same as the ratio of air flows chosen for these systems. From the basic design figure the swirl angle and area perpendicular to the air flow can be adjusted to obtain the optimum air movement in the cylinder.

Air coolers can be added at the delivery from the supercharging blower or series compressor or both without altering the substance of the invention. The ratio of the air supply quantities to the two air ducts may be altered automatically by changing the effective throughput of the engine driven compressor during operation, by known means as described in U.S. Patent No. 3,355,879. A reduction in throughput at high engine speed reduces the power required to drive the series charger and lowers the turbocharger speed.

The advantages of the invention relative to the normal series turbocharged engine are: the reduced size and cost of the engine driven compressor, the reduction in power required to drive it, and the elimination of this compressor as an air metering device limiting the flow from the turbocharger.

Figure 2:
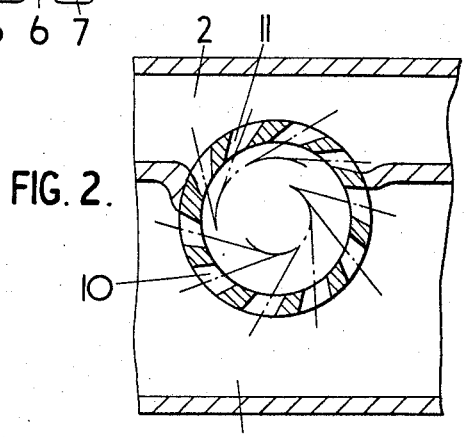
Figure 3:
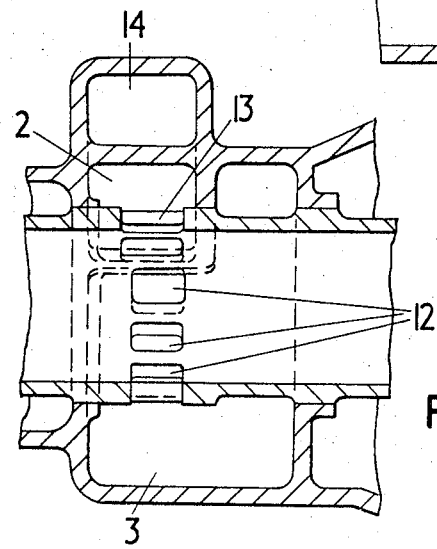

The accompanying drawing shows by way of example only, two embodiments of the invention, in which FIGURE 1 shows in diagrammatic form an engine in accordance with the invention having a divided air chest, FIGURE 2 shows a single belt of air ports having two swirl angles, while FIGURE 3 shows a single belt of air ports giving two air port timings, The engine 1 of FIGURE 1 is of the two-stroke cycle type having air chests 2 and 3 which supply the scavenging and charging air of the cylinders 4. The exhaust gases from these cylinders pass to the turbine 5 of the turbocharger 6 under pressure, which pressure determines the supercharge of the cylinder contents. The supercharging compressor 7 of this turbocharger supplies air normally at a pressure higher than the exhaust pressure directly to air chest 3 and also to the intake of engine driven compressor 8 which supplies air to air chest 2 at a pressure higher than that in air chest 3, the pressure increase given by compressor 8 being determined by control device 9.

FIGURE 2 shows a section of one cylinder showing the single belt of air ports all of which are uncovered by the piston at the same time. The ports 10 supply the cylinder from air chest 3 and may give some air swirl but are designed mainly for low flow loss. The air ports 11 supply the cylinder from air chest 2 and have a higher flow loss than ports 10 to correspond with the higher air pressure in this air chest. As shown, this loss is used to create a high velocity when the air is expanded down to the pressure in the cylinder, which is common to both charging systems.

FIGURE 3 shows in part section and part elevation an alternative form of single air port belt in which the ports 13 in communication with air chest 2 are uncovered earlier in the piston stroke than ports 12 in communication with air chest 3, in order to take advantage of the higher air pressure in air chest 2 in resisting back flow or exhaust gas into the air chest. The exhaust lead period is less than that required for ports 12. Air chest 2 has a relatively small volume, that is less than 4 cylinder volumes so that the air pressure fluctuates, reaching peaks between the periods of greatest demand. The peak pressures thereby occur just before scavenge, i.e., during the exhaust lead period. When scavenge commences this high pressure causes air to flow from the air chest to the cylinder at a rate greater than the delivery of the engine driven compressor to the air chest with the result that the pressure in air chest 2 drops until it is slightly lower than that in air chest 3 which then supplies substantial part of the scavenge flow. In the short time periods involved the initial discharge of air through ports 12 does not lower the pressure uniformly throughout the volume of air chest 2 but creates a depression wave which travels the length of the manifold to be reflected at the engine driven blower or closed end. The manifold space 14 may be joined to manifold 2 to form a continuation in length in order to delay the return of the reflected depression wave until after the lead period between air ports 12 and air ports 13.

In the invention a substantial part of the air used by the engine is supplied by the simple turbocharging system. With such a system the quantity of air delivered per cycle is dependent on the effective flow area through the engine. In many engines, particularly small engines of the high speed type, sufficient area is not available for the simple system to be used alone. The ports of engines requiring a high degree of air swirl have effective flow areas less than the opening area on the cylinder wall. To adapt the invention to such engines, porting shown on FIGURE 2 is used, in which the degree of swirl given by the ports 10 supplied by the simple system is reduced in order to give a low flow loss, and the swirl given by the series system by the action of ports 11 is made high by turning them more nearly tangential and reducing the area per unit of air flow. The major supply of energy to create swirl is then given by the series charger.

The flow losses of ports can be reduced by opening them earlier, either by increasing their height or lowering the piston crown. The degree to which this can be done is limited by the factors determining the economic length of the power stroke to exhaust port opening and the lead period required for the exhaust pressure to drop below the pressure in the air chest 3. Reduction in lead period permits the use of either larger air ports and/or a lengthening of the power stroke. It creates inefficiency of the turbocharger to have pressure fluctuations in its air delivery and so the air chest 3 should be large. However, air chest 2 may be reduced in volumes to cause fluctuations of pressure within it. Such fluctuations give high pressure during the exhaust lead period and so permit the air ports of this manifold 2 to be opened earlier than those of manifold 3. The resulting increase in total air port time × area improves the air flow through the engine, so increasing combustion efficiency, or when no such improvement is required it permits a later exhaust opening point to be used with the air port heights reduced to give the same means time × area. A higher engine power and efficiency then results from lengthening of the power stroke. The ports 13 can be arranged to give swirl but have the advantage that they are also suitable for use without swirl.

The engine driven compressor 8 may be of any known type driven at a fixed or variable speed ratio from the engine. The controller 9 sensing the pressure at the inlet to and delivery from the engine driven compressor varies the effective throughput of the compressor, that is the number of cylinder volumes of air passing per cycle through ports 11 or 13. Examples of such control means are described in patent application No. 580,128. By ensuring that the pressure rise through the engine driven blower does not exceed a predetermined value this control keeps the turbocharger working near its peak efficiency when the engine speed is changed, and decreases the power required to drive the engine driven compressor. Other control means could be used without departing from the invention.

It is to be understood that the above description is by way of example only and details for carrying the invention into effect may be varied without departing from the scope of the invention claimed.

I claim:

1. In a multi-cylinder, two-stroke cycle, internal combustion engine, having an exhaust-gas driven turbocharger, the improvement comprising at least two air chests adapted to supply each cylinder through a single belt of inlet ports, at least one said air chest being supplied directly by a turbocharger and at least one other air chest being supplied by a series charger in conjunction with said turbocharger, wherein the air supplied through the single belt of inlet ports serves the dual purpose of charging the cylinders and scavenging exhaust gases therefrom.

2. An engine as claimed in claim 1 in which the inlet ports communicating with the air chests supplied by the series charger offer a greater resistance to flow than those in communication with the air chests supplied by the simple turbocharging system.

3. An engine as claimed in claim 1 in which the air chest formed by the enclosed volume between the air ports and the series charger has a volume of less than 4 cylinder swept volumes.

4. An engine as claimed in claim 1 in which the air ports supplied by the series charger open earlier than those supplied directly by the turbocharger.

References Cited

UNITED STATES PATENTS

| | | | |
|---|---|---|---|
| 1,979,770 | 11/1934 | Pollister | 123—65 |
| 2,062,821 | 12/1936 | Pollister | 123—65 |
| 2,924,069 | 2/1960 | Buchi | 60—13 |

FOREIGN PATENTS 963,736   5/1957   Germany.

WENDELL E. BURNS, *Primary Examiner.*

U.S. Cl. X.R.

60—13; 123—119